(12) United States Patent
Lacovara

(10) Patent No.: US 12,458,062 B2
(45) Date of Patent: Nov. 4, 2025

(54) STEADY STATE RESISTANCE ESTIMATION FOR OVERHEATING PROTECTION OF A NICOTINE E-VAPING DEVICE

(71) Applicant: Altria Client Services LLC, Richmond, VA (US)

(72) Inventor: Robert C. Lacovara, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/358,531

(22) Filed: Jul. 25, 2023

(65) Prior Publication Data
US 2023/0363445 A1  Nov. 16, 2023

Related U.S. Application Data

(63) Continuation of application No. 16/929,689, filed on Jul. 15, 2020, now Pat. No. 11,744,285.

(51) Int. Cl.
*A24F 40/10*  (2020.01)
*A24F 40/51*  (2020.01)
*A24F 40/57*  (2020.01)

(52) U.S. Cl.
CPC .............. *A24F 40/10* (2020.01); *A24F 40/51* (2020.01); *A24F 40/57* (2020.01)

(58) Field of Classification Search
CPC .......... A24F 40/10; A24F 40/57; A24F 40/53; A24F 40/51; G05B 19/4155
See application file for complete search history.

(56) References Cited

U.S. PATENT DOCUMENTS 5,608,842 A * 3/1997 Broese ................. G05B 13/027
700/48
5,683,605 A 11/1997 Matsuoka
(Continued)

FOREIGN PATENT DOCUMENTS

CN 109259330 A * 1/2019 ........... A24F 47/008
HK 1244637 A1 8/2018
(Continued)

OTHER PUBLICATIONS

Office Action for U.S. Appl. No. 16/929,734 issued on May 16, 2024.
(Continued)

*Primary Examiner* — Hae Moon Hyeon
(74) *Attorney, Agent, or Firm* — Harness, Dickey & Pierce, P.L.C.

(57) ABSTRACT

Various example embodiments relate to a nicotine electronic vaping device, system, method, and/or non-transitory computer readable medium for protecting a nicotine electronic vaping device from overheating based on a steady state resistance prediction. The nicotine electronic vaping device includes a reservoir containing a nicotine pre-vapor formulation, a heating element configured to heat nicotine pre-vapor formulation drawn from the reservoir, and control circuitry configured to monitor a resistance value of the heating element over a first time period after a first application of negative pressure to the nicotine electronic vaping device, determine an estimated steady state resistance value of the heating element based on the monitored resistance value using a trained neural network, and control power to the heating element based on the estimated steady state resistance value.

20 Claims, 10 Drawing Sheets

(56) References Cited

U.S. PATENT DOCUMENTS

| | | |
|---|---|---|
| 6,434,504 B1 | 8/2002 | Eryurek et al. |
| 6,566,636 B1 | 5/2003 | Bentley et al. |
| 7,117,045 B2 | 10/2006 | Hittle et al. |
| 7,447,318 B2 | 11/2008 | Button et al. |
| 8,820,330 B2 | 9/2014 | Bellinger et al. |
| 9,256,230 B2 | 2/2016 | Matsuoka et al. |
| 9,477,240 B2 | 10/2016 | Musunuri et al. |
| 9,549,573 B2 | 1/2017 | Monsees et al. |
| 9,814,262 B2 | 11/2017 | Peleg et al. |
| 9,980,514 B2 * | 5/2018 | Malamud ............... A24F 40/53 |
| 10,413,521 B2 * | 9/2019 | Hearn ................... A61M 11/02 |
| 11,744,285 B2 * | 9/2023 | Lacovara ............... A24F 40/10 |
| | | 131/329 |
| 2013/0104916 A1 | 5/2013 | Bellinger et al. |
| 2014/0014126 A1 | 1/2014 | Peleg et al. |
| 2014/0334804 A1 | 11/2014 | Choi |
| 2015/0142387 A1 | 5/2015 | Alarcon et al. |
| 2016/0278435 A1 | 9/2016 | Choukroun et al. |
| 2017/0095005 A1 | 4/2017 | Monsees et al. |
| 2017/0108840 A1 | 4/2017 | Hawes et al. |
| 2017/0135411 A1 | 5/2017 | Cameron |
| 2018/0043114 A1 | 2/2018 | Bowen et al. |
| 2020/0197634 A1 | 6/2020 | Mizuguchi et al. |
| 2021/0052829 A1 * | 2/2021 | Dignum ................ A61M 15/06 |
| 2021/0106065 A1 * | 4/2021 | Yamada ................. A24F 40/51 |
| 2021/0161214 A1 | 6/2021 | Bilat |
| 2022/0015428 A1 | 1/2022 | Lacovara |
| 2022/0015443 A1 * | 1/2022 | Lacovara ........... G05D 23/2401 |

FOREIGN PATENT DOCUMENTS

| | | |
|---|---|---|
| JP | 2018-514191 A | 6/2018 |
| JP | 2020-096569 A | 6/2020 |
| KR | 20110006928 U | 7/2011 |
| RU | 61096 U1 | 2/2007 |
| WO | WO-2016150922 A2 | 9/2016 |
| WO | 2019/082281 A1 | 5/2019 |
| WO | 2019/228894 A1 | 12/2019 |
| WO | 2019/229112 A1 | 12/2019 |
| WO | 2019/244322 A1 | 12/2019 |
| WO | WO-2020/020796 A1 | 1/2020 |
| WO | WO-2021078785 A1 * | 4/2021 ............. A24F 40/10 |

OTHER PUBLICATIONS

Anderson, Charles W. et al., "Reinforcement Learning, Neural Networks and PI Control Applied to a Heating Coil", pp. 1-8.
International Search Report and Written Opinion of the International Searching Authority for International Application No. PCT/EP2021/069840 mailed on Oct. 27, 2021.
Written Opinion of the International Preliminary Examining Authority for International Application No. PCT/EP2021/069840 mailed on Jun. 20, 2022.
International Search Report and Written Opinion of the International Searching Authority for International Application No. PCT/US2021/037330 mailed on Sep. 9, 2021.
Chu, Hui; "Machine translation of CN 109259330," Translated Dec. 11, 2022; Espacenet.com (Year: 2022).
International Preliminary Report on Patentability for International Application No. PCT/EP2021/069840 mailed on Nov. 24, 2022.
International Preliminary Report on Patentability for International Application No. PCT/US2021/037330 mailed on Jan. 26, 2023.
Notice of Allowance for co-pending U.S. Appl. No. 16/929,689 issued on Apr. 19, 2023.
Office Action for U.S. Appl. No. 16/929,734 issued on Nov. 15, 2024.
RU Notice of Allowance and Search Report for Russian Patent Application No. 2023102848 issued on Nov. 5, 2024.
EP Office Action for European Patent Application No. 21739500.3 issued on Apr. 28, 2025.
JP Office Action for Japanese Patent Application No. 2023-502639 issued on May 27, 2025 and English translation thereof.
Japanese Office Action dated Jul. 3, 2025 for corresponding Japanese Application No. 2023-501263, and English-language translation thereof.
Japanese Decision to Grant dated Sep. 30, 2025 for corresponding Japanese Application No. 2023-502639.

* cited by examiner

STEADY STATE RESISTANCE ESTIMATION FOR OVERHEATING PROTECTION OF A NICOTINE E-VAPING DEVICE

CROSS-REFERENCE TO RELATED APPLICATIONS

The present application is a continuation of and claims the benefit of priority under 35 U.S.C. §§ 120/121 to U.S. patent application Ser. No. 16/929,689, filed on Jul. 15, 2020, the entire contents of which are hereby incorporated by reference.

BACKGROUND

Field

The present disclosure relates to systems, apparatuses, methods, and/or non-transitory computer readable media related to estimating and/or predicting a steady state resistance for nicotine electronic vaping devices (or nicotine e-vaping devices) in order to protect against overheating of the nicotine e-vaping device.

Description of Related Art

Nicotine electronic vaping devices (nicotine e-vaping devices, nicotine EVDs, nicotine vaping devices, nicotine vapor generators, etc.) generate nicotine vapor by heating a nicotine pre-vapor formulation, such as a liquid, solid, and/or gel formulation including, but not limited to, water, beads, solvents, active ingredients, ethanol, plant extracts, natural or artificial flavors, and/or at least one nicotine vapor formers such as glycerin and propylene glycol, into a nicotine vapor by heating the nicotine pre-vapor formulation carried by a wick to a heater (e.g., resistive heating coil, inductive heater, etc.), and the heater heats the nicotine pre-vapor formulation to a desired temperature (e.g., 100° C. to 200° C., etc.) which causes the nicotine pre-vapor formulation to vaporize into a nicotine vapor. However, when the amount of nicotine pre-vapor formulation stored by the nicotine e-vaping device in a nicotine cartridge, reservoir, nicotine pod, etc., begins to empty, the wick may start to dry out (e.g., not be fully wet, not fully adsorb the nicotine pre-vapor formulation, etc.), which in turn may cause the heater to over-heat the wick and/or over-heat the nicotine pre-vapor formulation. For example, the over-heating of the wick and/or nicotine pre-vapor formulation may introduce a "burnt," "acidic," and/or "bitter" smell or flavor to the generated nicotine vapor that is drawn by an adult vaper. This phenomena may be referred to as a "dry puff" and/or a "dry wick" event.

SUMMARY

Various example embodiments relate to systems, apparatuses, methods, and/or non-transitory computer readable media for detecting a dry puff event based on an estimated steady-state resistance value of a heater of a nicotine e-vaping device.

In at least one example embodiment, a nicotine electronic vaping device (EVD) may include a reservoir containing a nicotine pre-vapor formulation, a heating element configured to heat nicotine pre-vapor formulation drawn from the reservoir, and control circuitry. The control circuitry may be configured to monitor a resistance value of the heating element over a first time period after a first application of negative pressure to the nicotine EVD, determine an estimated steady state resistance value of the heating element based on the monitored resistance value using a trained neural network, and control power to the heating element based on the estimated steady state resistance value.

Some example embodiments of the nicotine EVD provide that the control circuitry is further configured to detect dry puff conditions at the nicotine EVD based on the estimated steady state resistance value of the heating element, and disable power to the heating element in response to the detected dry puff conditions.

Some example embodiments of the nicotine EVD provide that the control circuitry is further configured to prevent power from being applied to the heating element in response to detection of a second application of negative pressure to the nicotine EVD.

Some example embodiments of the nicotine EVD provide that the control circuitry is configured to monitor the resistance value of the heating element by determining a peak resistance value of the heating element during the first time period, and determining at least one additional resistance value of the heating element at a time after the determined peak resistance value during the first time period. The control circuitry may also be configured to determine the estimated steady state resistance value of the heating element by estimating the estimated steady state resistance value of the heating element using the trained neural network based on the peak resistance value and the at least one additional resistance value.

Some example embodiments of the nicotine EVD provide that the trained neural network is a function-fitting network configured to receive the peak resistance value and the at least one additional resistance value as input values, determine a decay in the input values over the first time period, and output the estimated steady state resistance value of the heating element based on results of the determined decay in the resistance value of the heating element over the first time period.

Some example embodiments of the nicotine EVD provide that the peak resistance value is determined at a time when the power being applied to the heating element is stopped after the first application of negative pressure to the nicotine EVD.

Some example embodiments of the nicotine EVD provide that the at least one additional resistance value includes at least a second resistance value and a third resistance value, the second resistance value is determined at a time following the time when the peak resistance value is determined and before the third resistance value is determined, and the third resistance value is determined at a time following the time when the second resistance value is determined and before detecting a second application of negative pressure.

Some example embodiments of the nicotine EVD provide that the heating element is connected to a Wheatstone bridge circuit, and the control circuitry is further configured to detect a variable resistance value corresponding to the heating element over the first time period, detect a resistance value corresponding to the Wheatstone bridge circuit over the first time period, and estimate the estimated steady state resistance value of the heating element using the trained neural network based on the detected variable resistance value corresponding to the heating element and the detected resistance value corresponding to the Wheatstone bridge circuit.

In at least one example embodiment, a method of operating a nicotine electronic vaping device (EVD) may include monitoring, using control circuitry of the nicotine EVD, a resistance value of a heating element included in the nicotine EVD over a first time period after a first application of negative pressure to the nicotine EVD, determining, using the control circuitry, an estimated steady state resistance value of the heating element based on the monitored resistance value using a trained neural network, and controlling, using the control circuitry, power to the heating element based on the estimated steady state resistance value.

In some example embodiments, the method may further include detecting, using the control circuitry, dry puff conditions at the nicotine EVD based on the estimated steady state resistance of the heating element, and disabling, using the control circuitry, power to the heating element in response to the detected dry puff conditions.

In some example embodiments, the method may further include detecting, using the control circuitry, a second application of negative pressure to the nicotine EVD, and preventing, using the control circuitry, power from being applied to the heating element in response to detecting of the second application of negative pressure to the nicotine EVD.

In some example embodiments, the monitoring the resistance value of the heating element includes determining a peak resistance value of the heating element during the first time period, and determining at least one additional resistance value of the heating element at a time after the determined peak resistance value during the first time period. The determining the estimated steady state resistance value of the heating element includes estimating the estimated steady state resistance value of the heating element using the trained neural network based on the peak resistance value and the at least one additional resistance value.

In some example embodiments, the trained neural network is a function-fitting network, and the method further includes receiving, using the control circuitry, the peak resistance value and the at least one additional resistance value as input values, determining, using the control circuitry, a decay in the resistance value of the heating element over the first time period, and outputting, using the control circuitry, the estimated steady state resistance value of the heating element based on results of the determined decay in the resistance value of the heating element over the first time period.

In some example embodiments, the peak resistance value is determined at a time when the power being applied to the heating element is stopped after the first application of negative pressure to the nicotine EVD.

In some example embodiments, the at least one additional resistance value includes at least a second resistance value and a third resistance value, the second resistance value is determined at a time following the time when the peak resistance value is determined and before the third resistance value is determined, and the third resistance value is determined at a time following the time when the second resistance value is determined and before detecting a second application of negative pressure.

In some example embodiments, the method may further include detecting, using the control circuitry, a variable resistance value corresponding to the heating element over the first time period, detecting, using the control circuitry, a resistance value corresponding to a Wheatstone bridge circuit over the first time period, and estimating, using the control circuitry, the estimated steady state resistance value of the heating element using the trained neural network based on the detected variable resistance value corresponding to the heating element and the detected resistance value corresponding to the Wheatstone bridge circuit.

In at least one example embodiment, a nicotine electronic vaping device (EVD) may include a reservoir containing a nicotine pre-vapor formulation, a heating element configured heat nicotine pre-vapor formulation drawn from the reservoir, heater resistance monitoring circuitry configured to determine a peak resistance value of the heating element during a first time period after a first application of negative pressure to the nicotine EVD, and determine at least one additional resistance value of the heating element during the first time period, a trained neural network configured to estimate a steady state resistance value of the heating element during the first time period based on the determined peak resistance value and the determined at least one additional resistance value, and control circuitry configured to disable power to the heating element based on the estimated steady state resistance value.

In some example embodiments, the trained neural network is further configured to detect dry puff conditions at the nicotine EVD based on the estimated steady state resistance value of the heating element, and the control circuitry is further configured to disable the power to the heating element in response to the detected dry puff conditions.

In some example embodiments, the trained neural network is a function-fitting network configured to receive the peak resistance value and the at least one additional resistance value as input values, determine a decay in the input values over the first time period, and output the estimated steady state resistance value of the heating element based on results of the determined decay in the resistance value of the heating element over the first time period.

In some example embodiments, the peak resistance value is determined at a time when the power being applied to the heating element is stopped after the first application of negative pressure to the nicotine EVD.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

Figure 1:
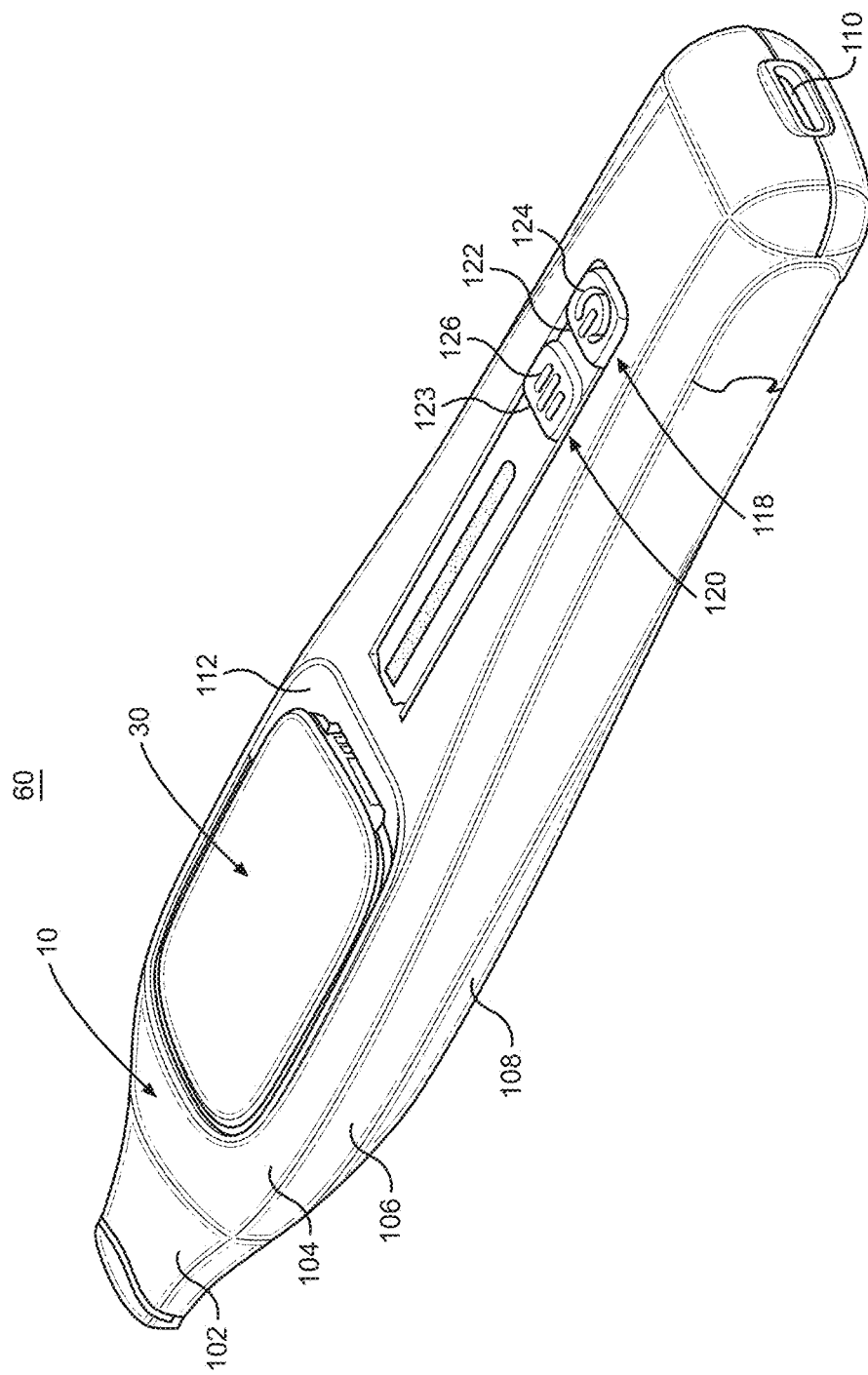
FIG. 1 is a perspective view of a nicotine electronic vaping or nicotine e-vaping device according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by example embodiments.

DETAILED DESCRIPTION

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a nicotine e-vaping device according to at least one example embodiment, however the example embodiments are not limited thereto, and the nicotine e-vaping device may take other forms. Referring to FIG. 1, a nicotine e-vaping device 60 includes a device body 10 that is configured to receive a nicotine pod assembly 30 (e.g., an nicotine e-vaping cartridge, etc.). The nicotine pod assembly 30 is a modular article configured to hold a nicotine pre-vapor formulation and may be replaceable. A "nicotine pre-vapor formulation" is a material or combination of materials that may be transformed into a nicotine vapor. For example, the nicotine pre-vapor formulation may be a liquid, solid, and/or gel formulation including, but not limited to, water, beads, solvents, active ingredients, ethanol, plant extracts, natural or artificial flavors, and/or nicotine vapor formers such as glycerin and propylene glycol. During nicotine vaping, the nicotine e-vaping device 60 is configured to heat the nicotine pre-vapor formulation to generate a nicotine vapor. As referred to herein, a "vapor" is any matter generated or outputted from any nicotine e-vaping device according to any of the example embodiments disclosed, claimed, and/or equivalents thereof, wherein such matter contains nicotine. The nicotine e-vaping device 60 may be regarded as an electronic nicotine delivery system (ENDS).

The device body 10 includes a front cover 104, a frame 106, and a rear cover 108. The front cover 104, the frame 106, and the rear cover 108 form a device housing that encloses mechanical elements, electronic elements, and/or circuitry associated with the operation of the nicotine e-vaping device 60. For instance, the device housing of the device body 10 may enclose a power supply (e.g., a power source, a battery, etc.) configured to power the nicotine e-vaping device 60, which may include supplying an electric current to the nicotine pod assembly 30. In addition, when assembled, the front cover 104, the frame 106, and the rear cover 108 may constitute a majority of the visible portion of the device body 10, but the example embodiments are not limited thereto.

The front cover 104 (e.g., first cover) defines a primary opening configured to accommodate a bezel structure 112. The bezel structure 112 defines a through hole 150 configured to receive the nicotine pod assembly 30.

The front cover 104 also defines a secondary opening configured to accommodate a light guide arrangement. The secondary opening may resemble a slot (e.g., segmented slot), although other shapes are possible depending on the shape of the light guide arrangement. Furthermore, the front cover 104 defines a tertiary opening and a quaternary opening configured to accommodate a first button 118 and a second button 120. Each of the tertiary opening and the quaternary opening may resemble a rounded square, although other shapes are possible depending on the shapes of the buttons. A first button housing 122 is configured to expose a first button lens 124, while a second button housing 123 is configured to expose a second button lens 126.

The operation of the nicotine e-vaping device 60 may be controlled by the first button 118 and the second button 120. For instance, the first button 118 may be a power button, and the second button 120 may be an intensity button. Although two buttons are shown in the drawings in connection with the light guide arrangement, it should be understood that more (or less) buttons may be provided depending on the available features and desired user interface.

The frame 106 (e.g., base frame) is the central support structure for the device body 10 (and the nicotine e-vaping device 60 as a whole). The frame 106 may be referred to as a chassis. The frame 106 includes a proximal end, a distal end, and a pair of side sections between the proximal end and the distal end. The proximal end and the distal end may also be referred to as the downstream end and the upstream end, respectively. As used herein, "proximal" (and, conversely, "distal") is in relation to an adult vaper during nicotine vaping, and "downstream" (and, conversely, "upstream") is in relation to a flow of the nicotine vapor. A bridging section may be provided between the opposing inner surfaces of the side sections (e.g., about midway along the length of the frame 106) for additional strength and stability. The frame 106 may be integrally formed so as to be a monolithic structure.

The rear cover 108 (e.g., second cover) also defines an opening configured to accommodate the bezel structure 112. The front cover 104 and the rear cover 108 may be configured to engage with the frame 106 via a snap-fit arrangement.

The device body 10 also includes a mouthpiece 102. The mouthpiece 102 may be secured to the proximal end of the frame 106. Additionally, at least one end of the mouthpiece 102 may include a plurality of air outlets (not shown) through which nicotine vapor generated by the nicotine e-vaping device 60 may be drawn.

The distal end of the nicotine e-vaping device 60 includes a port 110 (e.g., a mini-Universal Serial Bus (USB) connector, etc.). The port 110 is configured to receive an electric current (e.g., via a mini-USB cable, a USB cable, a power cable, etc.) from an external power source so as to charge a power supply (e.g., a power source, a battery, etc.) (not shown) within the nicotine e-vaping device 60. In at least one example embodiment, the nicotine e-vaping device 60 may be configured to receive electrical current from a wireless power source (e.g., a wireless charging pad, etc.). In addition, the port 110 may also be configured to send data to and/or receive data (e.g., via a mini-USB cable, a USB cable, etc.) from another nicotine e-vaping device or other electronic device (e.g., phone, tablet, computer, etc.). Furthermore, the nicotine e-vaping device 60 may be configured for wireless communication with another electronic device, such as a phone, tablet, computer, server, kiosk, wireless beacon, Virtual Reality (VR)/Augmented Reality (AR) device, etc., via an application software (app) installed on that electronic device (e.g., a nicotine e-vaping device application, etc.). In such an instance, an adult vaper may control or otherwise interface with the nicotine e-vaping device 60 (e.g., locate the nicotine e-vaping device 60, check nicotine e-vaping device and/or nicotine pod assembly status information, change operating parameters, lock/unlock the nicotine e-vaping device 60, etc.) through the app.

The nicotine e-vaping device 60 includes a nicotine pod assembly 30 configured to hold a nicotine pre-vapor formulation. The nicotine pod assembly 30 may be removable (e.g., replaceable), or permanently affixed to the nicotine e-vaping device 60 and refillable with nicotine pre-vapor formulation. The nicotine pod assembly 30 has an upstream end (which faces the light guide arrangement) and a downstream end (which faces the mouthpiece 102). In a non-limiting example embodiment, the upstream end is an opposing surface of the nicotine pod assembly 30 from the downstream end. The nicotine pod assembly 30 includes a connector module (not shown) that is disposed within the nicotine pod body and exposed by openings in the upstream end. The external face of the connector module includes at least one electrical contact. The at least one electrical contact may include a plurality of power contacts configured to electrically connect with at least one power contact (not shown) of the device body 10 (e.g., at least one power contact of the port 110, etc.). In addition, the at least one electrical contact of the nicotine pod assembly 30 includes a plurality of data contacts. The plurality of data contacts of the nicotine pod assembly 30 are configured to electrically connect with data contacts (not shown) of the device body 10 (e.g., at least one power contact of the port 110, etc.).

The nicotine pod assembly 30 may include a reservoir (not shown) within the assembly and configured to hold the nicotine pre-vapor formulation. The reservoir may be configured to hermetically seal the nicotine pre-vapor formulation until an activation of the nicotine pod assembly 30 to release the nicotine pre-vapor formulation from the reservoir. As a result of the hermetic seal, the nicotine pre-vapor formulation may be isolated from the environment as well as the internal elements of the nicotine pod assembly 30 that may potentially react with the nicotine pre-vapor formulation, thereby reducing or preventing the possibility of adverse effects to the shelf-life and/or sensorial characteristics (e.g., flavor) of the nicotine pre-vapor formulation. The nicotine pod assembly 30 may also contain structures configured to activate the nicotine pod assembly 30 and to receive and heat the nicotine pre-vapor formulation released from the reservoir after the activation.

The nicotine pod assembly 30 may be activated manually by an adult vaper prior to the insertion of the nicotine pod assembly 30 into the device body 10. Additionally, the nicotine pod assembly 30 may be activated as part of the insertion of the nicotine pod assembly 30 into the device body 10. In an example embodiment, the nicotine pod body includes a perforator (e.g., pin, etc.) configured to release the nicotine pre-vapor formulation from the reservoir during the activation of the nicotine pod assembly 30.

As shown, the device body 10 and the nicotine pod assembly 30 include mechanical elements, electronic elements, and/or circuitry associated with the operation of the nicotine e-vaping device 60. For instance, the nicotine pod assembly 30 may include mechanical elements configured to actuate to release the nicotine pre-vapor formulation from a sealed reservoir within. The nicotine pod assembly 30 may also have mechanical aspects configured to engage with the device body 10 to facilitate the insertion and seating of the nicotine pod assembly 30.

Additionally, the nicotine pod assembly 30 may be a "smart pod" that includes electronic elements and/or circuitry configured to store, receive, and/or transmit information to/from the device body 10. Such information may be used to authenticate the nicotine pod assembly 30 for use with the device body 10 (e.g., to reduce and/or prevent usage of an unapproved/modified/counterfeit nicotine pod assembly). Furthermore, the information may be used to identify a type of the nicotine pod assembly 30 which is then correlated with a vaping profile based on the identified type. The vaping profile may be designed to set forth the general parameters for the heating of the nicotine pre-vapor formulation and may be subject to tuning, refining, or other adjustment by an adult vaper before and/or during nicotine vaping.

The nicotine pod assembly 30 may also communicate with the device body 10 other information that may be relevant to the operation of the nicotine e-vaping device 60. Examples of relevant information may include a level of the nicotine pre-vapor formulation within the nicotine pod assembly 30 and/or a length of time that has passed since the nicotine pod assembly 30 was inserted into the device body 10 and activated.

The device body 10 may include mechanical elements (e.g. complementary structures) configured to engage, hold, and/or activate the nicotine pod assembly 30. In addition, the device body 10 may include electronic elements and/or circuitry configured to receive an electric current to charge the internal power source which, in turn, is configured to supply power to the nicotine pod assembly 30 during nicotine vaping. Furthermore, the device body 10 may include electronic elements and/or circuitry configured to communicate with the nicotine pod assembly 30, a different nicotine e-vaping device, a non-nicotine e-vaping device, other electronic devices (e.g., phone, tablet, computer, etc.), and/or the adult vaper, etc.

The device body 10 may also include a device electrical connector (not shown) that is configured to electrically engage with the nicotine pod assembly 30 and supply power from the device body 10 to the nicotine pod assembly 30 via the device electrical connector during nicotine vaping. In addition, data can be sent to and/or received from the device body 10 and the nicotine pod assembly 30 via the device electrical connector.

According to some example embodiments, the nicotine pod assembly 30 may include a wick (not shown) that is configured to transfer a nicotine pre-vapor formulation to a heater (not shown). The heater is configured to heat the nicotine pre-vapor formulation during nicotine vaping to generate a nicotine vapor. The heater is electrically connected to at least one electrical contact of the device electrical connector. In an example embodiment, the heater includes a folded heating element, however the example embodiments are not limited thereto. In such an instance, the wick may have a planar form configured to be held by the folded heating element, but the example embodiments are not limited thereto. When the nicotine pod assembly 30 is assembled, the wick is configured to be in fluidic communication with an absorbent material such that the nicotine pre-vapor formulation that will be in the absorbent material (when the nicotine pod assembly 30 is activated) will be transferred to the wick via capillary action. In the present specification, a heater may also be referred to as a heating engine, heating coil, etc.

According to at least some example embodiments, the wick may be a fibrous pad or other structure with pores/interstices designed for capillary action. In addition, the wick may have a rectangular shape, although example embodiments are not limited thereto.

In an example embodiment, the heater is configured to undergo Joule heating (which is also known as ohmic/resistive heating) upon the application of an electric current thereto. Stated in more detail, the heater may be formed of one or more conductors and configured to produce heat when an electric current passes therethrough. The electric current may be supplied from a power supply (e.g., a power source, a battery, etc.) within the device body 10 and conveyed to the heater via power contacts.

The heater and associated structures are discussed in more detail in U.S. application Ser. No. 15/729,909, titled "Folded Heater For Electronic Vaping Device", filed Oct. 11, 2017, the entire contents of which is incorporated herein by reference.

Figure 2:
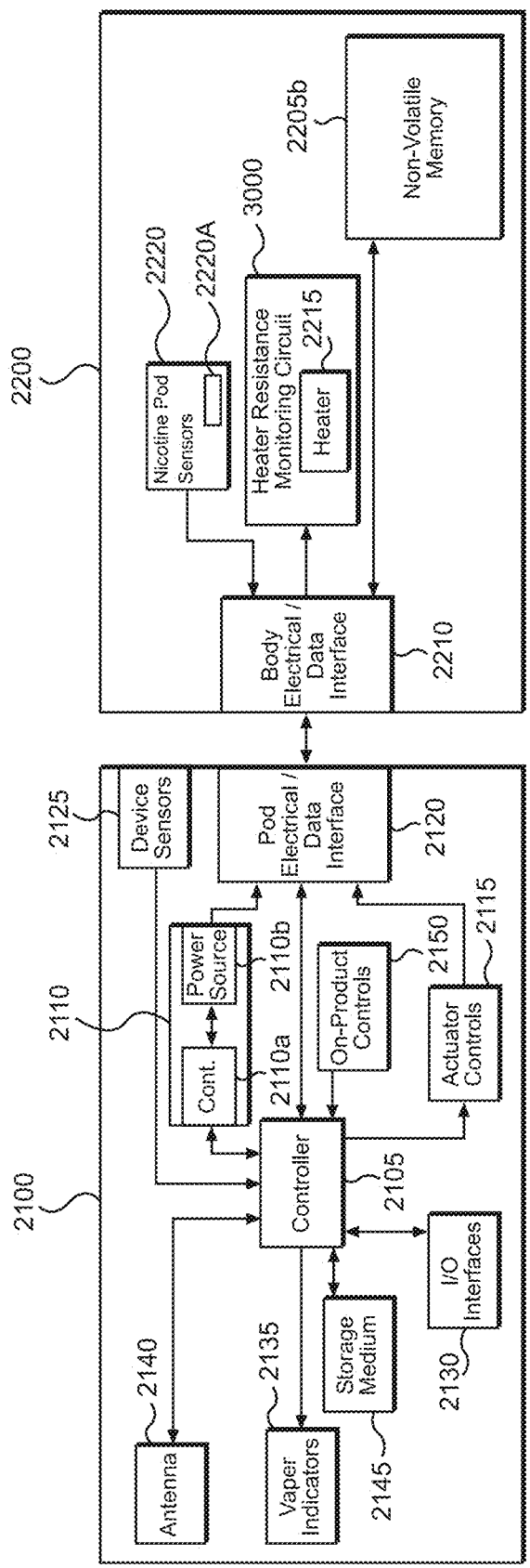
FIG. 2 illustrates a schematic view of an example of a device system including an example nicotine e-vaping device body connected to an example nicotine pod system according to at least one example embodiment.

FIG. 2 illustrates a schematic view of an example of a device system including an example nicotine e-vaping device body connected to an example nicotine pod system according to at least one example embodiment.

The device system 2100 includes a controller 2105, a power supply 2110, actuator controls 2115, a nicotine pod electrical/data interface 2120, device sensors 2125, input/output (I/O) interfaces 2130, vaper indicators 2135, at least one antenna 2140, on-product controls 2150, a storage medium 2145, and/or a heater resistance monitoring circuit 3000. However, the device system 2100 is not limited to the features shown in FIG. 2, and may include greater or lesser number of constituent elements.

The controller 2105 may be hardware, firmware, hardware executing software or any combination thereof. When the controller 2105 is hardware, such existing hardware may include one or more Central Processing Units (CPUs), microprocessors, processor cores, multiprocessors, digital signal processors (DSPs), application-specific-integrated-circuits (ASICs), field programmable gate arrays (FPGAs) computers or the like configured as special purpose machines to perform the functions of the controller 2105. CPUs, microprocessors, processor cores, multiprocessors, DSPs, ASICs and FPGAs may generally be referred to as processing devices.

In the event where the controller 2105 is, or includes, a processor executing software, the controller 2105 is configured as a special purpose machine (e.g., a processing device) to execute the software, stored in memory accessible by the controller 2105 (e.g., the storage medium 2145 or another storage device), to perform the functions of the controller 2105. The software may be embodied as program code including instructions for performing and/or controlling any or all operations described herein as being performed by the controller 2105.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

According to an example embodiment, the controller 2105 may include at least one microprocessor, etc. Further, the controller 2105 may include input/output interfaces, such as general purpose input/outputs (GPIOs), inter-integrated circuit (I2C) interfaces, serial peripheral interface bus (SPI) interfaces, or the like; a multichannel analog-to-digital converter (ADC) and/or digital-to-analog converter (DAC); and/or a clock input terminal, etc. However, example embodiments should not be limited to this example. For example, the controller 2105 may further include arithmetic circuitry or circuits.

Returning to FIG. 2, the controller 2105 communicates with the power supply 2110, the actuator control 2115, the nicotine pod electrical/data interface 2120, the device sensors 2125, the input/output (I/O) interfaces 2130, the vaper indicators 2135, the on-product controls 2150, and the at least one antenna 2140, etc.

The controller 2105 may also communicate with a non-volatile memory 2205*b* (NVM) in the nicotine pod assembly 30, a heater resistance monitoring circuit 3000, and/or nicotine pod sensors 2220, through the nicotine pod electrical/data interface 2120 and the body electrical/data interface 2210. According to at least one example embodiment, the NVM 2205*b* may be a cryptographic coprocessor and non-volatile memory package (CC-NVM) (not shown), but the example embodiments are not limited thereto. More specifically, the controller 2105 may utilize encryption to authenticate the nicotine pod assembly 30. As will be described, the controller 2105 communicates with the NVM or CC-NVM package to authenticate the nicotine pod assembly 30. More specifically, the non-volatile memory is encoded during manufacture with product and other information for authentication.

The memory device may be coded with an electronic identity to permit at least one of an authentication of the nicotine pod assembly 30 and a pairing of operating parameters specific to a type of the nicotine pod assembly 30 (or physical construction, such as a heating engine type) when the nicotine pod assembly 30 is inserted into the device body 10. In addition to authenticating based on an electronic identity of the nicotine pod assembly 30, the controller 2105 may authorize use of the nicotine pod assembly 30 based on an expiration date of the stored nicotine pre-vapor formulation and/or heater encoded into the NVM or the non-volatile memory of the CC-NVM. If the controller 2105 determines that the expiration date encoded into the non-volatile memory has passed, the controller 2105 may not authorize use of the nicotine pod assembly 30 and disable the nicotine e-vaping device 60.

The controller 2105 (or storage medium 2145) stores key material and proprietary algorithm software for the encryption. For example, encryption algorithms rely on the use of random numbers. The security of these algorithms depends on how truly random these numbers are. These numbers are usually pre-generated and coded into the processor or memory devices. Example embodiments may increase the randomness of the numbers used for the encryption by using the nicotine vapor drawing parameters (e.g., durations of instances of nicotine vapor drawing, intervals between instances of nicotine vapor drawing, or combinations of them) to generate numbers that are more random and more varying from individual to individual than pre-generated random numbers. All communications between the controller 2105 and the nicotine pod assembly 30 may be encrypted.

The controller 2105 may also include a cryptographic accelerator to allow resources of the controller 2105 to perform functions other than the encoding and decoding involved with the authentication. The controller 2105 may also include other security features such as preventing unauthorized use of communication channels and preventing unauthorized access to data if a nicotine pod or adult vaper is not authenticated.

In addition to a cryptographic accelerator, the controller 2105 may include other hardware accelerators. For example, the controller 2105 may include a floating point unit (FPU), a separate DSP core, digital filters and Fast Fourier Transform (FFT) modules, etc.

The controller 2105 is configured to operate a real time operating system (RTOS), control the device system 2100 and may be updated through communicating with the NVM or CC-NVM or when the device system 2100 is connected with other devices (e.g., a smart phone, etc.) through the I/O interfaces 2130 and/or the antenna 2140. The I/O interfaces 2130 and the antenna 2140 allow the device system 2100 to connect to various external devices such as smart phones, tablets, PCs, etc. For example, the I/O interfaces 2130 may include a micro-USB connector, but are not limited thereto. The micro-USB connector may be used by the device system 2100 to charge the power source 2110*b*.

The controller 2105 may include on-board RAM and flash memory to store and execute code including analytics, diagnostics and software upgrades. As an alternative, the storage medium 2145 may store the code. Additionally, in another example embodiment, the storage medium 2145 may be on-board the controller 2105.

The controller 2105 may further include on-board clock, reset and power management modules to reduce an area covered by a Printed Circuit Board (PCB) in the device body 10.

The device sensors 2125 may include a number of sensor transducers that provide measurement information to the controller 2105. The device sensors 2125 may include a power supply temperature sensor, an external nicotine pod temperature sensor, a current sensor for the heater, a power supply current sensor, an air flow sensor, and an accelerometer to monitor movement and orientation, etc., but is not limited thereto. The power supply temperature sensor and external nicotine pod temperature sensor may be a thermistor or thermocouple and the current sensor for the heater and power supply current sensor may be a resistive based sensor or another type of sensor configured to measure current. The air flow sensor may be a microelectromechanical system (MEMS) flow sensor or another type of sensor configured to measure air flow such as a hot-wire anemometer, etc. Further, instead of, or in addition to, measuring air flow using a flow sensor included in the device sensors 2125 of the device system 2100 of the device body 100, air flow may be measured using one or more sensors located in the nicotine pod assembly 30, etc.

The data generated from one or more of the device sensors 2125 may be sampled at a sample rate appropriate to the parameter being measured using a discrete, multi-channel analog-to-digital converter (ADC).

The controller 2105 may adapt heater profiles for a nicotine pre-vapor formulation and other profiles based on the measurement information received from the controller 2105. For the sake of convenience, these are generally referred to as vaping or vapor profiles. The heater profile identifies the power profile to be supplied to the heater during the few seconds when nicotine vapor drawing takes place. For example, a heater profile can deliver maximum power to the heater when an instance of nicotine vapor drawing is initiated, but then after a desired time period (e.g., approximately one second, or so) immediately reduce the power to half way or a quarter way. According to at least some example embodiments, the modulation of electrical power provided to the heater may be implemented using pulse width modulation.

In addition, a heater profile can also be modified based on a negative pressure applied on the nicotine e-vaping device 60. The use of the MEMS flow sensor allows nicotine vapor drawing strength to be measured and used as feedback to the controller 2105 to adjust the power delivered to the heater of the nicotine pod, which may be referred to as heating or energy delivery.

According to at least some example embodiments, when the controller 2105 recognizes the nicotine pod is currently installed (e.g., via Stock Keeping Unit (SKU), serial number, unique identification number, public encryption key corresponding to the individual nicotine pod, etc.), the controller 2105 matches an associated heating profile that is designed for that particular nicotine pod. The controller 2105 and the storage medium 2145 will store data and algorithms that allow the generation of heating profiles for various nicotine pod types, nicotine pre-vapor formulations, etc. In another example embodiment, the controller 2105 may read the heating profile from the nicotine pod. Adult vapers may also adjust heating profiles to suit their personal preferences.

As shown in FIG. 2, the controller 2105 sends data to, and receives data from, the power supply 2110. The power supply 2110 includes a power source 2110b and a power controller 2110a to manage the power output by the power source 2110b.

The power source 2110b may be a Lithium-ion battery or one of its variants, for example a Lithium-ion polymer battery. Alternatively, the power source 2110b may be a Nickel-metal hydride battery, a Nickel cadmium battery, a Lithium-manganese battery, a Lithium-cobalt battery or a fuel cell. The power source 2110b may be rechargeable and include circuitry allowing the battery to be chargeable by an external charging device. In that case, the circuitry, when charged, provides power for a desired (or alternatively a pre-determined) number of instances of nicotine vapor drawing, after which the circuitry must be re-connected to an external charging device.

The power controller 2110a provides commands to the power source 2110b based on instructions from the controller 2105. For example, the power supply 2110 may receive a command from the controller 2105 to provide power to the nicotine pod (through the nicotine pod electrical/data interface 2120) when the nicotine pod is authenticated and the adult vaper activates the device system 2100 (e.g., by activating a switch such as a toggle button, capacitive sensor, IR sensor, applying a negative air pressure on the mouthpiece, etc.). When the nicotine pod is not authenticated, the controller 2105 may either send no command to the power supply 2110 or send an instruction to the power supply 2110 to not provide power. In another example embodiment, the controller 2105 may disable all operations of the device system 2100 if the nicotine pod is not authenticated.

In addition to supplying power to the nicotine pod, the power supply 2110 also supplies power to the controller 2105. Moreover, the power controller 2110a may provide feedback to the controller 2105 indicating performance of the power source 2110b.

The controller 2105 sends data to, and receives data from, the at least one antenna 2140. The at least one antenna 2140 may include a Near Field Communication (NFC) modem and a Bluetooth Low Energy (LE) modem and/or other modems for other wireless technologies (e.g., Wi-Fi, etc.). In an example embodiment, the communications stacks are in the modems, but the modems are controlled by the controller 2105. The Bluetooth LE modem is used for data and control communications with an application on an external device (e.g., smart phone, tablet, computer, wireless beacon, etc.). The NFC modem may be used for pairing of the nicotine e-vaping device 60 to the application and retrieval of diagnostic information. Moreover, the Bluetooth LE modem may be used to provide location information (for an adult vaper to find the nicotine e-vaping device 60) or authentication during a purchase.

The controller 2105 supplies information to the vaper indicators 2135 to indicate statuses and occurring operations to the adult vaper. The vaper indicators 2135 include a power indicator (e.g., at least one Light Emitting Diode (LED)) that may be activated when the controller 2105 senses a button pressed by the adult vaper. The vaper indicators 2135 may also include a vibrator, speaker, an indicator for a current state of an adult vaper-controlled nicotine vaping parameter (e.g., nicotine vapor volume) and other feedback mechanisms.

Furthermore, the device system 2100 may include a number of on-product controls 2150 that provide commands from an adult vaper to the controller 2105. The on-product controls 2150 include an on-off button which may be a toggle button, capacitive sensor or IR sensor, for example. The on-product controls 2150 may further include a nicotine vaping control button (if the adult vaper desires to override the buttonless nicotine vaping feature to energize the heater), a hard reset button, a touch based slider control (for controlling setting of a nicotine vaping parameter such as nicotine vapor drawing volume), a nicotine vaping control button to activate the slider control and a mechanical adjustment for an air inlet. Hand to mouth gesture (HMG) detection is another example of buttonless nicotine vaping. Further, a combination of key strokes (e.g., key strokes entered by an adult vaper via the on-product controls 2150) can be used to lock the nicotine e-vaping device 60 and prevent the device from operating to produce nicotine vapor. According to at least some example embodiments, the combination of key strokes may be set by a manufacturer of the nicotine e-vaping device 60 and/or the device system 2100. According to at least some example embodiments, the combination of key strokes may be set, or changed, by an adult vaper (e.g., by key strokes entered by the adult vaper via the on-product controls 2150).

According to at least one example embodiment, a nicotine pod system 2200 may include a heater 2215, a non-volatile memory 2205b, a body electrical/data interface 2210, one or more nicotine pod sensors 2220, and/or a heater resistance monitoring circuit 3000, but the example embodiments are not limited thereto. The nicotine pod system 2200 communicates with the device system 2100 through the body electrical/data interface 2210 and the nicotine pod electrical/data interface 2120.

The heater 2215 may be actuated by the controller 2105 and may transfer heat to at least a portion of the nicotine pre-vapor formulation in the nicotine pod assembly 30, for example, in accordance with the commanded profile (volume, temperature (based on power profile) and flavor) from the controller 2105 in order to vaporize the nicotine pre-vapor formulation into a nicotine vapor. The controller 2105 may determine an amount of nicotine pre-vapor formulation to heat based on feedback from the nicotine pod sensors or the heater 2215. The flow of nicotine pre-vapor formulation may be regulated by a micro-capillary or wicking action. Moreover, the controller 2105 may send commands to the heater 2215 to adjust an air inlet to the heater 2215.

The heater 2215 may be a planar body, a ceramic body, a single wire, a cage of resistive wire, a wire coil surrounding a wick, a mesh, a surface or any other suitable form for example. Examples of suitable electrically resistive materials include titanium, zirconium, tantalum and metals from the platinum group. Examples of suitable metal alloys include stainless steel, nickel-, cobalt-, chromium-, aluminum-titanium-zirconium-, hafnium-, niobium-, molybdenum-, tantalum-, tungsten-, tin-, gallium-, manganese- and iron-containing alloys, and super-alloys based on nickel, iron, cobalt, stainless steel. For example, the heater may be formed of nickel aluminides, a material with a layer of alumina on the surface, iron aluminides and other composite materials, the electrically resistive material may optionally be embedded in, encapsulated or coated with an insulating material or vice-versa, depending on the kinetics of energy transfer and the external physicochemical properties required. In one embodiment, the heater 2215 comprises at least one material selected from the group consisting of stainless steel, copper, copper alloys, nickel-chromium alloys, superalloys and combinations thereof. In an example embodiment, the heater 2215 is formed of nickel-chromium alloys or iron-chromium alloys. In at least one example embodiment, the heater 2215 can be a ceramic heater having an electrically resistive layer on an outside surface thereof.

In another example embodiment, the heater 2215 may be constructed of an iron-aluminide (e.g., FeAl or $Fe_3Al$). Additionally, according to some example embodiments, the heater 2215 may be included in the device system 2100, and not the nicotine pod system 2200.

In the example embodiment of FIG. 2, the nicotine pod system 2200 may include the non-volatile memory 2205b in place of a CC-NVM, and the cryptographic coprocessor is omitted. When no cryptographic coprocessor exists in the nicotine pod system 2200, the controller 2105 may read data from the non-volatile memory 2205b without use of a cryptographic coprocessor to control/define the heating profile. However, when a cryptographic coprocessor is included in the nicotine pod system 2200, the cryptographic coprocessor may control the transmission (e.g., the reading) of the information coded on the NVM 2205b to the controller 2105, and/or reception (e.g., the writing) of information from the controller 2105 to be stored on the NVM 2205b.

Moreover, the non-volatile memory 2205b may store information, such as a stock keeping unit (SKU) of the nicotine pre-vapor formulation in the nicotine pre-vapor formulation compartment (including nicotine pre-vapor formulation composition), software patches for the device system 2100, product usage information such as nicotine vapor drawing instance count, nicotine vapor drawing instance duration, and nicotine pre-vapor formulation level, etc. The non-volatile memory 2205b may store operating parameters specific to the type of the nicotine pod and the nicotine pre-vapor formulation composition. For example, the non-volatile memory 2205b may store the electrical and mechanical design of the nicotine pod for use by the controller 2105 to determine commands corresponding to a desired nicotine vaping profile. Additionally, the non-volatile memory 2205b may store special purpose computer readable instructions corresponding to a trained neural network. The trained neural network will be discussed in further detail in connection with FIGS. 4A to 7B.

The nicotine pre-vapor formulation level may be an approximate measurement of the nicotine pre-vapor formulation level in the nicotine pod and may be determined, for example, using one of the nicotine pod sensors 2220 to directly measure the nicotine pre-vapor formulation level in the nicotine pod, and/or using the controller 2105 to count a number of nicotine vapor drawing instances corresponding to the nicotine pod in the non-volatile memory 2205b, with the count of the nicotine vapor drawing instances used as a proxy to the amount of nicotine pre-vapor formulation vaporized.

The controller 2105 and/or the storage medium 2145 may store nicotine pre-vapor formulation calibration data that identifies an operating point for the nicotine pre-vapor formulation composition. The nicotine pre-vapor formulation calibration data includes data describing how nicotine pre-vapor formulation flow rate changes with a remaining nicotine pre-vapor formulation level or how volatility changes with an age of the nicotine pre-vapor formulation and may be used for calibration by the controller 2105. The nicotine pre-vapor formulation calibration data may be stored by the controller 2105 and/or the storage medium 2145 in a table format. The nicotine pre-vapor formulation calibration data allows the controller 2105 to equate the nicotine vapor drawing instance count to the amount of nicotine pre-vapor formulation vaporized.

The controller 2105 writes the nicotine pre-vapor formulation level and nicotine vapor drawing instance count back to the non-volatile memory 2205b in the nicotine pod so if the nicotine pod is removed from the device body 10 and later on re-installed, an accurate nicotine pre-vapor formulation level of the nicotine pod will still be known by the controller 2105.

The operating parameters (e.g., power supply parameters, power duration parameters, air channel control parameters, etc.) are referred to as a vaping profile. Moreover, the non-volatile memory 2205b may record information communicated by the controller 2105. The non-volatile memory 2205b may retain the recorded information even when the device body 10 becomes disconnected from the nicotine pod.

In an example embodiment, the non-volatile memory 2205b may be a programmable read only memory.

The data generated from the nicotine pod sensors 2220 may be sampled at a sample rate appropriate to the parameter being measured using a discrete, multi-channel analog-to-digital converter (ADC). The nicotine pod sensors 2220 may include, for example, a heater temperature sensor, nicotine pre-vapor formulation flow rate monitor, an air flow sensor, an ohmmeter to measure the resistance of the heater, and/or a puff detector, etc. According to at least one example embodiment, the heater temperature sensor may be a thermistor or thermocouple and the nicotine pre-vapor formulation flow rate sensing may be performed by the nicotine pod system 2200 using electrostatic interference or an in-pre-vapor formulation rotator.

Additionally, according to at least one example embodiment, the nicotine pod system 2200 further includes a heater resistance monitoring circuit 3000 which measures the resistance of the heater 2215. The heater resistance monitoring circuit will be discussed in further detail in connection with FIGS. 3A and 3B. Further, according to other example embodiments, the heater resistance monitoring circuit 3000 may be included in the device system 2100.

While FIGS. 1 to 2 depict example embodiments of a nicotine e-vaping device, the nicotine e-vaping device is not limited thereto, and may include additional and/or alternative hardware configurations that may be suitable for the purposes demonstrated. For example, the nicotine e-vaping device may include a plurality of additional or alternative elements, such as additional or alternative heating elements, reservoirs, batteries, etc. Additionally, while FIGS. 1 to 2 depict the example embodiment of the nicotine e-vaping device as being embodied in two separate housing elements, additional example embodiments may be directed towards a nicotine e-vaping device arranged in a single housing, and/or in more than two housing elements.

Figure 3A:
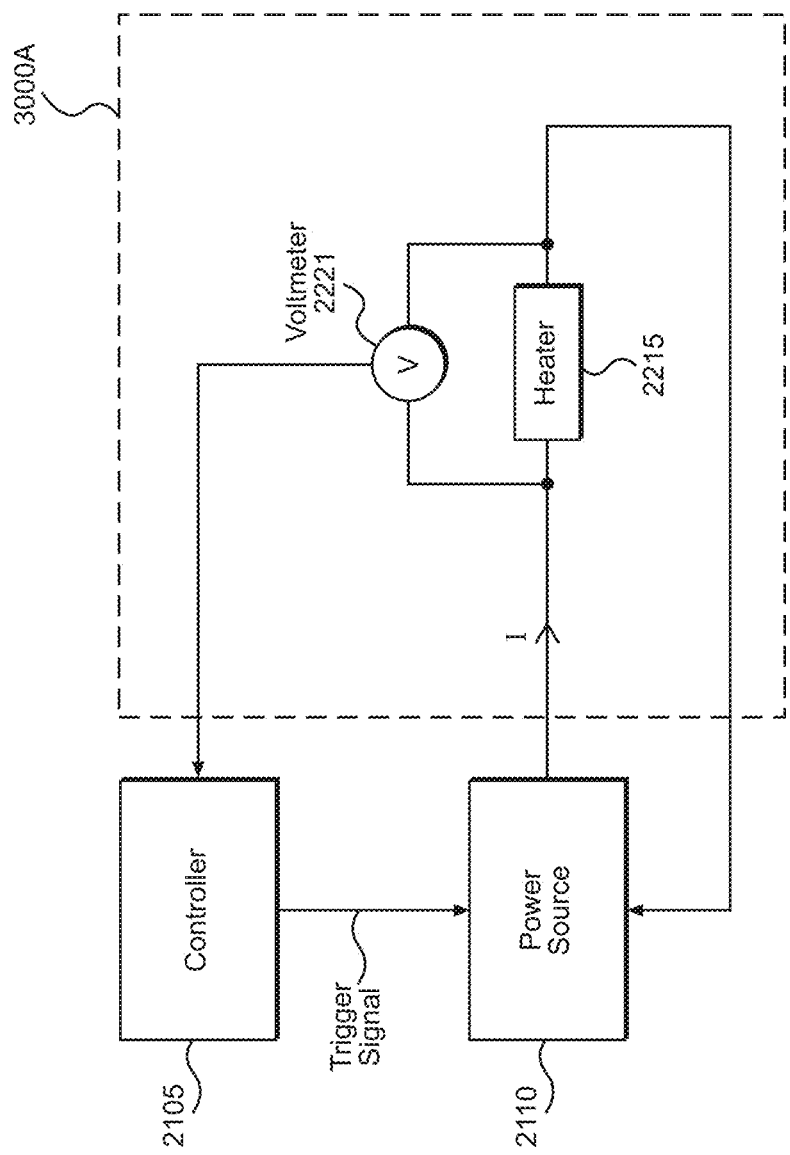
FIGS. 3A and 3B are block diagrams illustrating various elements of example heater resistance monitoring circuits for a nicotine e-vaping device according to some example embodiments.
Figure 3B:
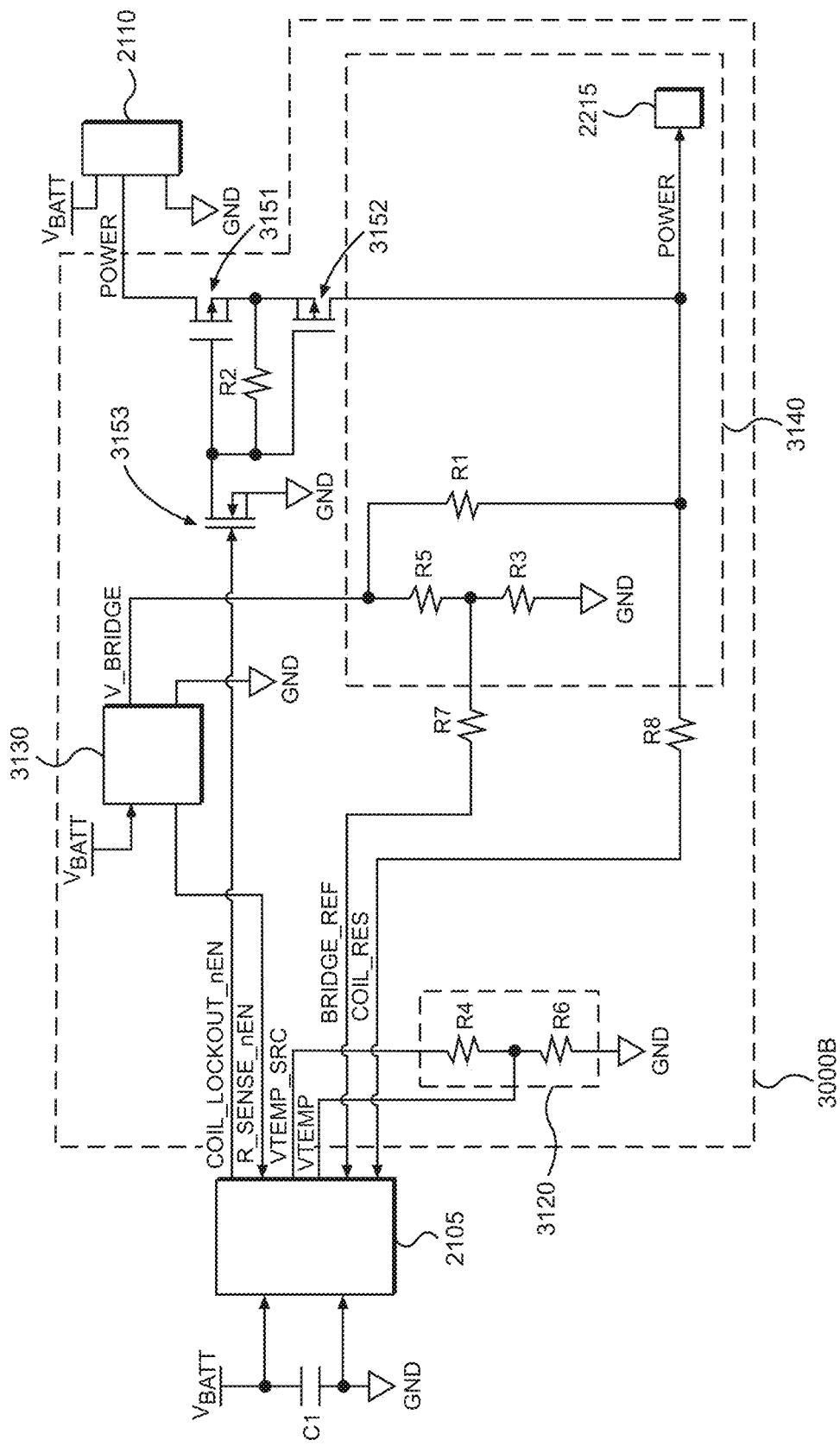

FIGS. 3A and 3B are block diagrams illustrating various elements of example heater resistance monitoring circuits for a nicotine e-vaping device according to some example embodiments.

Referring to FIG. 3A, according to at least one example embodiment, a nicotine e-vaping device may include a heater resistance monitoring circuit 3000A to detect a resistance of a heater (e.g., heating coil), such as heater 2215, in real-time (e.g., continuously monitor and/or dynamically monitor the resistance of the heater, etc.), or at desired points of time controlled by a controller of the nicotine e-vaping device, such as the controller 2105, but not limited thereto. The heater resistance monitoring circuit 3000A may include a voltage meter 2221 (e.g., voltmeter) connected to at least the controller 2105, the power source 2110, and the heater 2215, but the example embodiments are not limited thereto. For example, the example embodiments may further include one or more reference resistors in series between the power source 2110 and the heater 2215 with known resistance values to facilitate the calculation of the resistance of the heater 2215, a second, special purpose controller for measuring the resistance of the heater and executing a trained neural network for estimating a steady-state resistance of the heater, etc. The power source 2110 may be configured to output at least two power signals to the heater 2215, a first power signal during normal operation mode of the nicotine e-vaping device 60, and a second power signal during a heater resistance measurement operation mode, etc., based on a trigger signal (e.g., a command signal, instruction, etc.) output from the controller 2105, but the example embodiments are not limited thereto. During normal operation of the nicotine e-vaping device, the normal operating power from the power source 2110 flows to the heater 2215. In response to the controller 2105 outputting a trigger signal indicating the start of a heater resistance measurement operation, the power source 2110 may output a second power signal of a known current value. The voltmeter 2221 is connected to the power source 2110 and the controller 2105, in parallel with the heater 2215. The voltmeter 2221 measures the voltage drop across the heater 2215 and outputs the measured voltage drop to the controller 2105. The controller 2105 then calculates the resistance of the heater 2215 using Ohm's law based on the known current value output by the power source 2110 and the voltage drop measured by the voltmeter 2221. After a short time period (e.g., about 50 ms to about 100 ms), the controller 2105 stops outputting the trigger signal to the power source 2110 and normal power from the power source 2110 is available to flow again to the heater 2215.

Referring to FIG. 3B, according to at least one other example embodiment, the heater resistance monitoring circuit may be configured to detect the resistance of a heater, in real-time (e.g., continuously monitor and/or dynamically monitor the resistance of the heater, etc.), or at desired points of time controlled by the controller 2105. The heater resistance monitoring circuit 3000B may include a plurality of MOSFETs, a load switch 3130, at least one controller 2105, a voltage divider 3120, and/or a Wheatstone bridge 3140, but the example embodiments are not limited thereto. For example, according to other example embodiments, the heater resistance monitoring circuit 3000B may further include a second, special purpose controller for measuring the resistance of the heater and executing a trained neural network for estimating a steady-state resistance of the heater, etc. The plurality of MOSFETS may include at least a first and second PMOSFET 3151 and 3152 connected in a back-to-back configuration and tied between a power source (e.g., power source 2110) and the heater 2215, and at least one NMOSFET 3153 wherein the drain D of the NMOSFET 3153 is connected to the gates G of the PMOSFETs 3151 and 3152, and the gate G of the NMOSFET 3153 is connected to the controller 2105. During normal operation of the nicotine e-vaping device, the power from the power source 2110 flows through the closed PMOSFETs 3151 and 3152 to the heater 2215.

The Wheatstone bridge may include at least a first resistor R1, a second resistor R3, and a third resistor R5, but is not limited thereto, and the resistors may all have fixed resistance values (e.g., known, non-variable resistance values). The Wheatstone bridge may be connected to the heater 2215 and may use the heater 2215 as a variable resistance in conjunction with the fixed value R1 resistor, and the R3 and R5 resistors may form the fixed resistance of the Wheatstone bridge. The Wheatstone bridge may also be connected in series with the load switch 3130. The load switch 3130 may output a signal R_SENSE_nEN signal to the controller 2105 that causes the controller 2105 to begin detection/monitoring of the heater resistance by outputting a COIL_LOCKOUT_nEN signal to the PMOSFETs 3151 and 3152. In response to the COIL_LOCKOUT_nEN signal, the PMOSFETs 3151 and 3152 are opened and power to the heater 2215 is cut (e.g., stopped). The controller 2105 then senses the variable resistance COIL_RES and the fixed resistance BRIDGE_REF using the voltage V_BRIDGE from the load switch 3130. After a short time period (e.g., about 50 ms to about 100 ms, etc.), the controller 2105 stops outputting the COIL_LOCKOUT_nEN signal, and power from the power source 2110 is available to flow again to the heater 2215 through the PMOSFETs 3151 and 3152.

The controller 2105 may determine a resistance value for the heater 2215 by calculating a difference between the measured variable resistance COIL_RES and the known resistance of the resistor R1 to determine the resistance of the heater 2215 during the time period of the resistance monitoring.

While FIGS. 3A and 3B depict example embodiments of a heater resistance monitoring circuit, the example embodiments are not limited thereto and other heater resistance monitoring circuits may include additional and/or alternative hardware configurations that may be suitable for the purposes demonstrated.

Figure 4A:
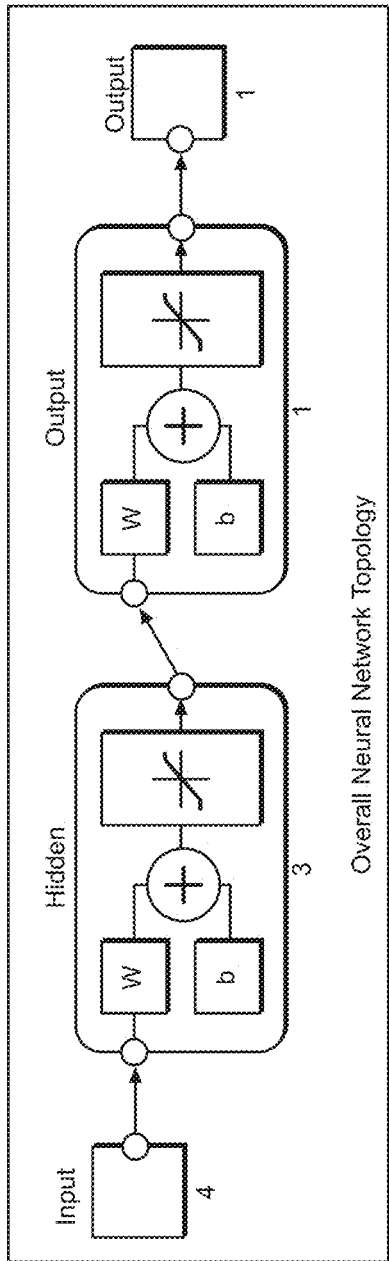
FIGS. 4A to 4C are diagrams illustrating a neural network for predicting a resistance value of a heating element of a nicotine e-vaping device according to at least one example embodiment.
Figure 4B:
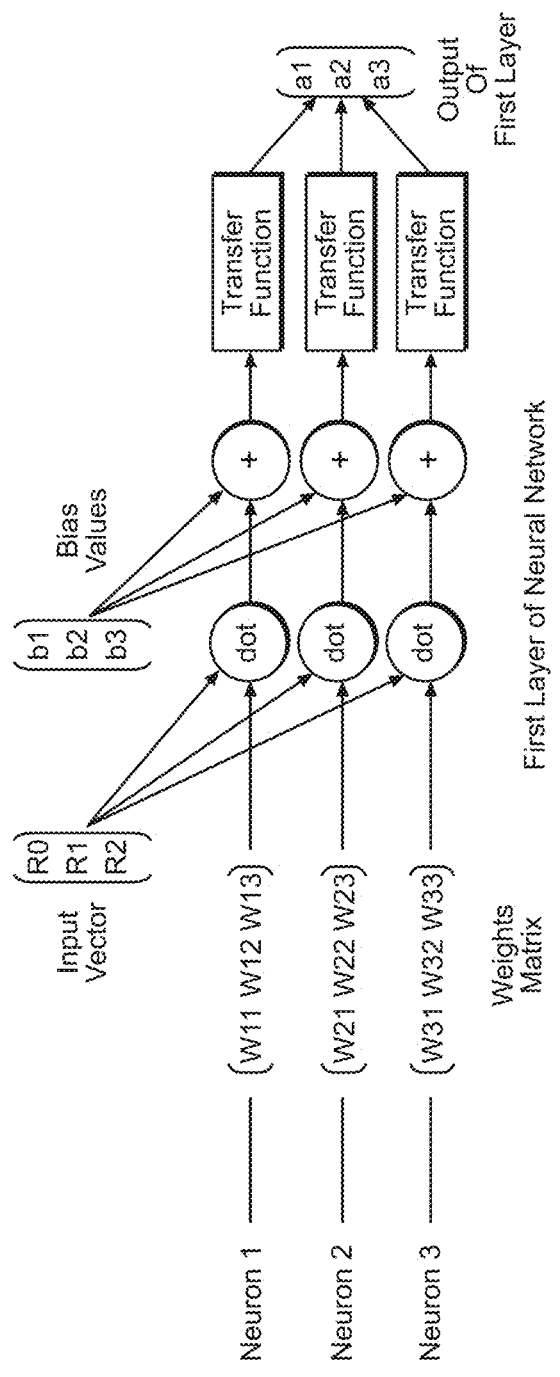
Figure 4C:
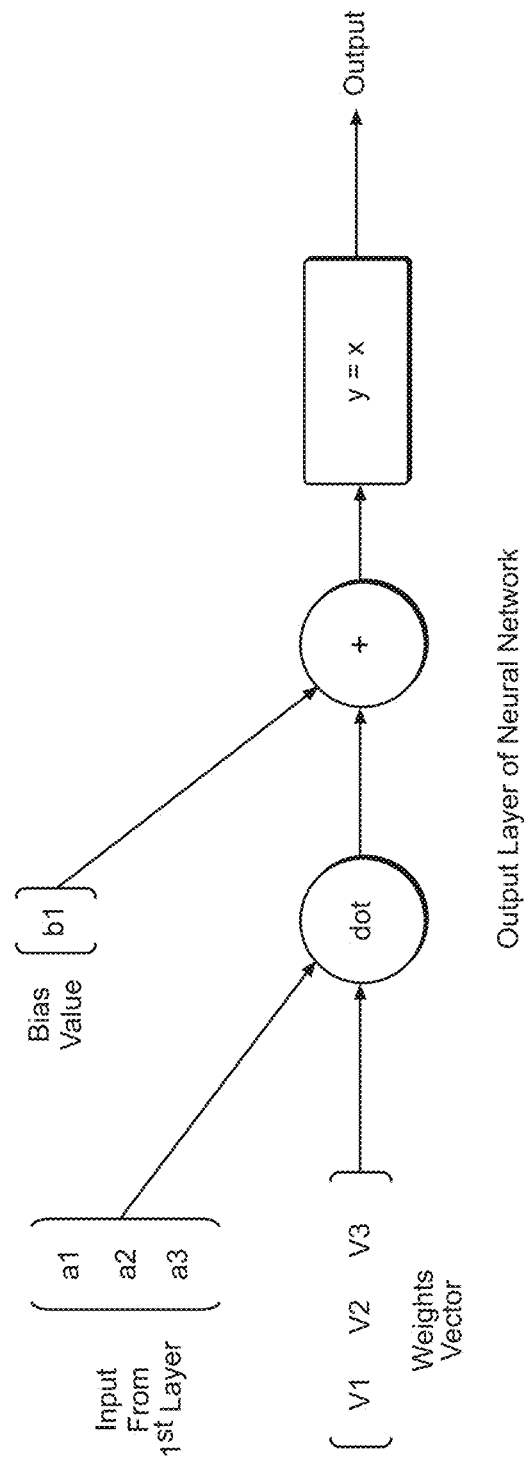
Figure 5:
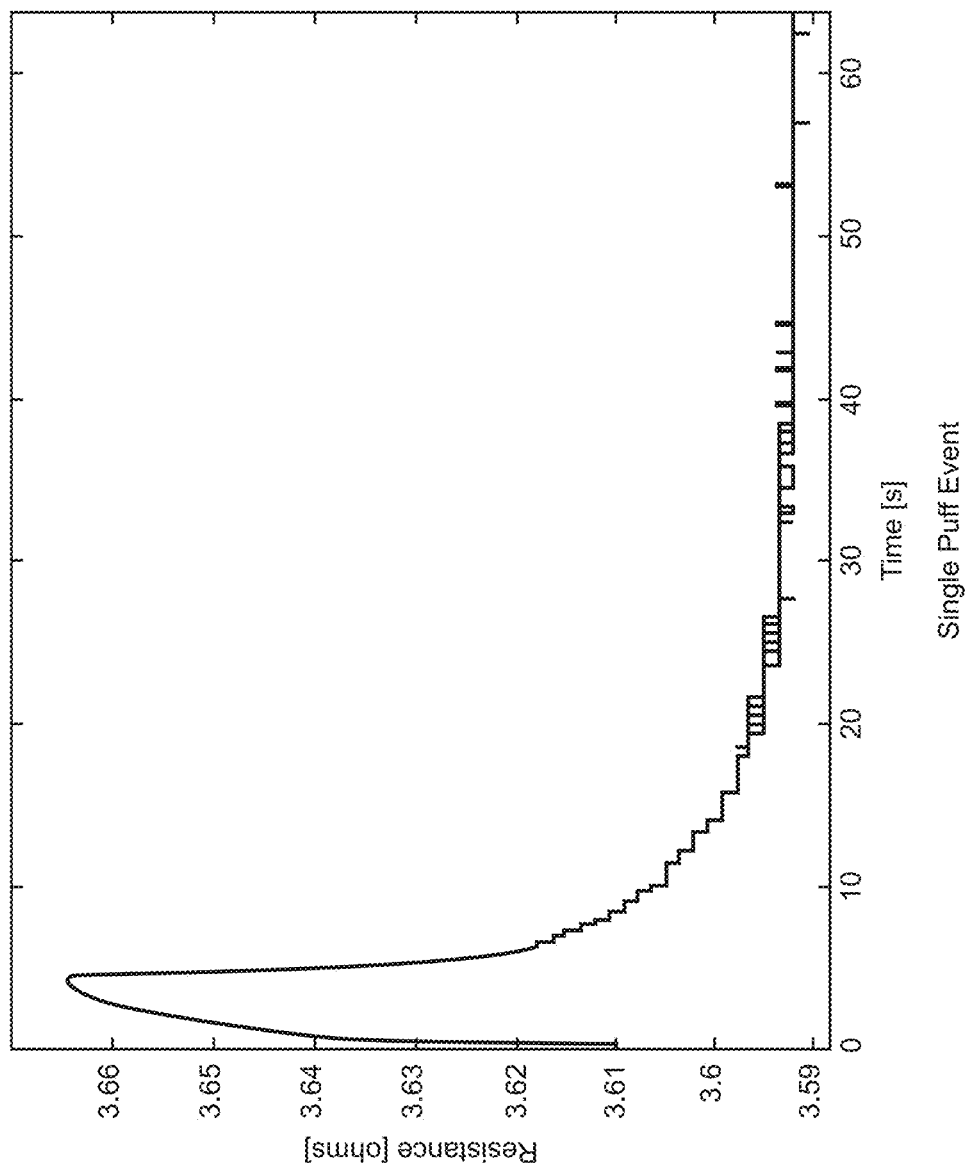
FIG. 5 is a graph corresponding to resistance values of a heating element of a nicotine e-vaping device during a single puff event according to at least one example embodiment.
Figure 6:
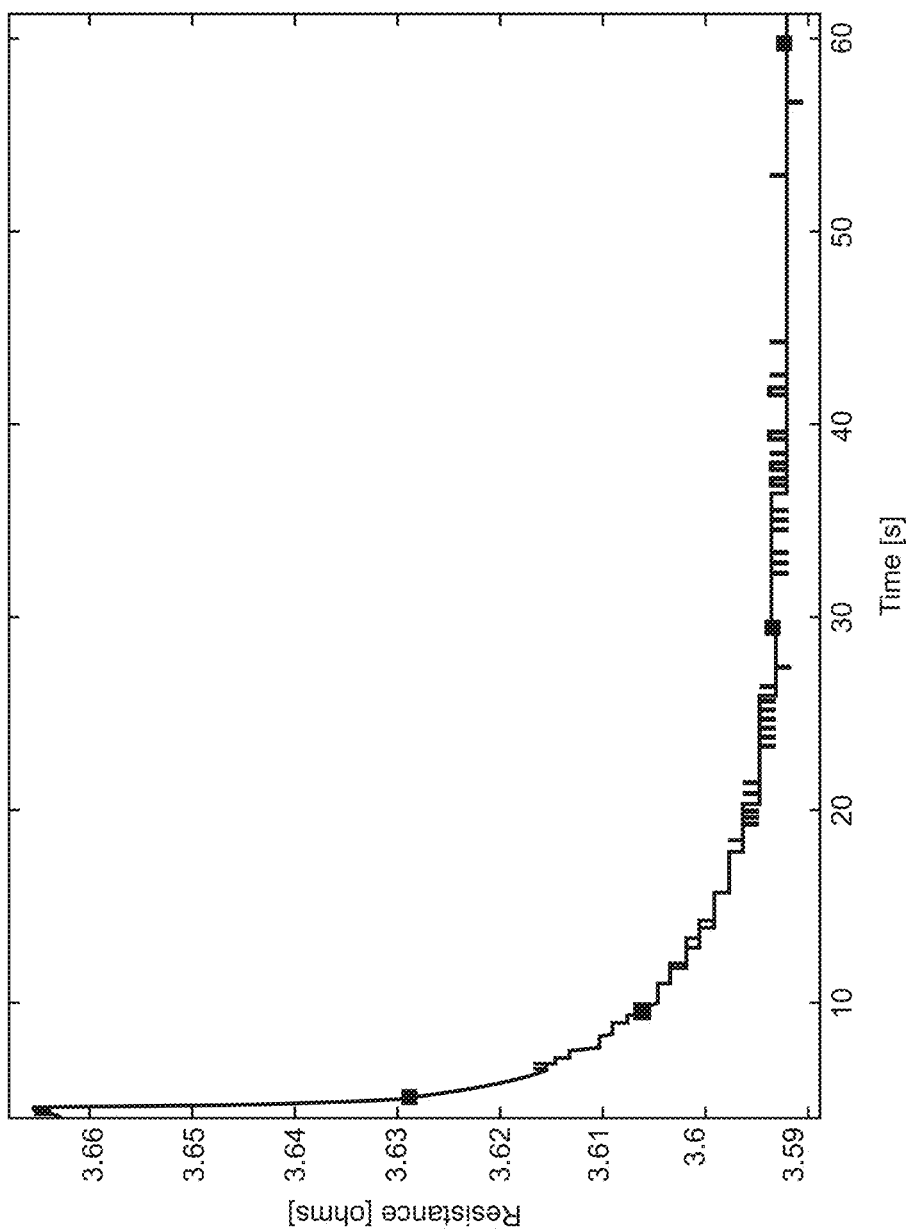
FIG. 6 is a graph illustrating the resistance decay following a single puff event according to at least one example embodiment.

FIGS. 4A to 4C are diagrams illustrating a neural network for predicting and/or estimating a steady state resistance value of a heating element of a nicotine e-vaping device according to at least one example embodiment. FIG. 5 is a graph illustrating resistance values of a heating element of a nicotine e-vaping device during a single puff event according to at least one example embodiment. FIG. 6 is a graph illustrating the resistance decay following a single puff event according to at least one example embodiment.

According to at least one example embodiment, a neural network implemented on a nicotine e-vaping device may be used to determine a steady state resistance (e.g., a base line resistance value, a final resistance value, etc.) of a heating element included in the nicotine e-vaping device (e.g., heater 2215), after a puff event of an adult vaper, and the steady state resistance may be used to detect a dry puff event (e.g., a dry wick event, etc.) of the nicotine e-vaping device.

Referring first to FIG. 5, the electrical resistance of the heater 2215 is dependent on the heater's temperature and metallurgy, and the electrical resistance value of the heater 2215 may change as the heater's temperature increases or decreases, such as when power is applied to the heater 2215 in order to vaporize nicotine pre-vapor formulation stored on a wick. For example, the temperature-dependent resistance of a heater may change only about 2% due to the temperature of the heater if the heater is composed of nichrome-60 wire, but the temperature-dependent resistance of a heater made from stainless steel may change up to about 20% based on the temperature of the stainless steel heater, etc.

During a puff event (e.g., the application of negative pressure on the mouthpiece of a nicotine e-vaping device by an adult vaper), power is supplied to the heater 2215 from the power source 2110, thereby increasing the temperature of the heater 2215 to a sufficient temperature to vaporize the nicotine pre-vapor formulation. After the completion of the puff event (and assuming another puff event does not occur), the power supplied from the power source 2110 to the heater 2215 is stopped by the controller 2105, and the temperature of the heater 2215, and correspondingly, the resistance value of the heater 2215, decays until reaching a steady state temperature/resistance value.

As shown in FIG. 5, which illustrates the resistance values of an example heater of a nicotine e-vaping device over time corresponding to a plurality of puff events (e.g., a training set of puff events), and as shown in FIG. 6, which illustrates the decay of resistance values after a single puff event over time, an initial resistance measurement during a puff event may reach a local maximum resistance value (e.g., approximately 3.67 ohms) and then decay over a decay period of approximately 30 to 60 seconds to a local minimum resistance value (e.g., approximately 3.6 ohms). The local maximum resistance value may be considered to be a peak resistance value of the heater 2215 for a puff event, and the local minimum resistance value may be considered to be the steady state resistance value (e.g., final resistance value) of the heater 2215 for a puff event. According to at least one example embodiment, the resistance values of the heater 2215 may be measured in real-time using the heater resistance monitoring circuit of FIG. 3A or 3B, but the example embodiments are not limited thereto, and other real-time heater resistance monitoring circuits may be used.

Additionally, the steady state resistance values of the heater 2215 increase as the amount of nicotine pre-vapor formulation stored on a wick decreases, and therefore the steady state resistance values may detect a dry puff event based on the steady state resistance values being compared to a dry puff detection threshold value. Additionally, according to some example embodiments, when the nicotine e-vaping device does not include a wick, the steady state resistance values also increase as the amount of nicotine pre-vapor formulation being heated and/or vaporized by the heating element decreases. The dry puff detection threshold value may be determined based on experimental data (e.g., laboratory testing, etc.) regarding the steady state resistance value observed for a heater metallurgy composition, heater design type, and known power values supplied to the heater for each particular nicotine e-vaping device.

However, while a heater resistance monitoring circuit may be used to accurately measure a steady state resistance value of a heater after a single puff event, the heater resistance monitoring circuit may not provide accurate measurements of a steady state resistance value of the heater when multiple puff events occur before the completion of the decay period. For example, common adult vaper behavior may include two or more puff events occurring within approximately 30 seconds or less (e.g., the adult vaper applying first negative air pressure at $t_0$, and then applying second negative air pressure at $t_1$, $t_1 <= t_0 + 30$ seconds). Consequently, because the heater of the nicotine e-vaping device is not powered off for the entire decay period (e.g., about 30 seconds to about 60 seconds), the steady state resistance value for a first puff event is not reached because power is again applied to the heater for the second puff event.

Example embodiments provide methods for determining a more accurate estimation of the steady state resistance value which does not require the adult vaper to wait about 30 to 60 seconds between puff events to detect whether a dry puff event has occurred.

Referring now to FIGS. 4A to 4C, according to at least one example embodiment a neural network may be provided to estimate the steady state resistance value of a heater of a nicotine e-vaping device based on at least two measured resistance values of the heater during and/or after a puff event. According to at least one example embodiment, two or more measured resistance values of the heater may be used to estimate (and/or predict) a heater resistance value 30 to 60 seconds after the end of the puff event, which corresponds to an estimate of the steady state resistance value (e.g., an estimated final resistance value), and therefore does not require the adult vaper to wait for expiration of the decay period (e.g., about 30 seconds to about 60 seconds) for an accurate detection of the dry puff event to be completed. For example, a first measured heater resistance value may be observed at the time when the power to the heater 2215 is cut off (to measure the peak resistance value of the heater), and a second measured heater resistance value may be observed a short time later, at the beginning of the decay slope of the resistance values (e.g., about 0.5 seconds, etc.). However, the example embodiments are not limited thereto, and for example, the number of measured heater resistance values used to estimate the steady state heater resistance value may be three or more, and for example, a third measured heater resistance value may be observed following the second measured heater resistance value, such as at the beginning of the decay curve's ankle (e.g., about 2.0 seconds after power to the heater 2215 is cut off, etc.), and a fourth measured heater resistance value may be observed following the third measured heater resistance value and before a second puff event occurs, etc. Additionally, the times at which the heater resistances are measured may be adjusted, and the decay period may be adjusted to a suitable time period based on the temperature/resistance characteristics of the heater included in the nicotine e-vaping device, etc.

According to at least one example embodiment, the neural network may be implemented as special purpose program code (e.g., special purpose computer readable instructions) loaded onto a controller of a nicotine e-vaping device, such as the controller 2105, but the example embodiments are not limited thereto, and the neural network may be implemented in a separate special purpose processor (e.g., a specially programmed FPGA, a special purpose ASIC, a special purpose SoC, etc.) included in the nicotine e-vaping device, etc., and/or the neural network may be provided over a wired and/or wireless network connection to a specially programmed external computing device, etc.

Referring more specifically now to FIG. 4A, FIG. 4A illustrates an overall topology for a neural network according to at least one example embodiment. The neural network itself may be a function-fitting network that approximates a "most reasonable" function corresponding to the decay process of the resistance of the heater, and according to at least one example embodiment, the neural network may calculate the following function:

$$R(t) = Ae^{-\left(\frac{t}{t_1}\right)} + Be^{-\left(\frac{t}{t_2}\right)} + R_f \qquad \text{Equation 1}$$

In the above equation, R(t) refers to a resistance function over time (e.g., a function covering a peak resistance to a steady state resistance value), A and B are first and second decay magnitudes, $t_1$ refers to a first decay rate factor corresponding to a first (e.g., fast) decay rate of temperature observed in a nicotine e-vaping device, $t_2$ refers to a second decay rate factor corresponding to a second (e.g., slow) decay rate of temperature observed in a nicotine e-vaping device, and $R_f$ refers to an original resistance value of the heater 2215 (e.g., the resistance value of the heater when no power is applied to the heater, or at a time when the heater is "cool," etc.). The decay magnitudes A and B, and decay rate $t_1$ and decay rate $t_2$ are constant values that vary based on the composition of particular nicotine pods (e.g., are based on/influenced by the composition of the materials forming the heater, wick, and/or nicotine pre-vapor formulation, etc.). These constant values may be obtained from experimental data.

According to at least one example embodiment, the topology of the neural network may include at least an input stage, wherein the measured resistance value(s) of the heater of the nicotine e-vaping device are input into the neural network, at least one hidden layer which outputs a vector(s) to at least one output layer, and the output layer may output a single scalar value as the estimated steady state (e.g., final) resistance value of the heater of the nicotine e-vaping device. However, the example embodiments are not limited thereto, and there may be more or less layers, inputs and/or outputs included in the neural network.

FIG. 4B illustrates the at least one hidden layer (e.g., first layer, intermediate layer, activation layer, etc.) of the neural network according to at least one example embodiment, but the example embodiments are not limited thereto. While the present disclosure refers to the first layer (e.g., intermediate layer) of the neural network as a "hidden" layer for the sake of convenience, the example embodiments are not limited thereto and in some example embodiments, the first layer may be connected to external connections along with the input layer, and therefore may not be a true "hidden" layer. In FIG. 4B, the at least one hidden layer may include three neurons (e.g., activation nodes, etc.) in a single hidden layer, the example embodiments are not limited thereto, and the number of hidden layers may be greater than one, and the number of neurons in one or more of the hidden layers may be greater or lesser than three, etc. Each of the three neurons may receive an input vector including the measured heater resistance values (e.g., R0, R1, R2, etc.) as well as a weight matrix. Each of the neurons of the at least one hidden layer may take a dot product of the input vector and a single row of the weight matrix, resulting in a 3-tuple vector. The 3-tuple vector may then have a bias value vector added, resulting in a vector "n", which is applied to a transfer function element by element to produce a vector "a."

According to at least one example embodiment, the transfer function used may be a tangent sigmoid, or tansig, as shown below, however the example embodiments are not limited thereto.

$$a = \frac{2}{1 + e^{-2n}} - 1 \qquad \text{Equation 2}$$

However, according to some example embodiments, a Taylor expansion of the tansig function (Equation 3) and/or an application of Homer's rule (Equation 4) may be used as the transfer function instead of the tansig function, particularly with regards to low processing power controllers (e.g., 8-bit controllers with or without a floating point unit, etc.), in order to more efficiently perform the calculations of the hidden layer.

$$y = x - \frac{x^3}{3} \qquad \text{Equation 3}$$

$$y = x\left(1 - \frac{x^2}{3}\right) \qquad \text{Equation 4}$$

However, the example embodiments are not limited thereto.

Referring now to FIG. 4C, FIG. 4C illustrates an output layer of the neural network according to at least one example embodiment. According to at least one example embodiment, the output layer of the neural network may include a single neuron, and the single neuron may include an output weight vector, an input vector output by the hidden layer, a bias value, and a transfer function, however the example embodiments are not limited thereto. The neuron of the output layer may take a dot product of the output vector "a" of the hidden layer and the output weight vector. The resulting output may be added with a bias value, and the result may be input to a transfer function. As shown in FIG. 4C, according to at least one example embodiment, the bias value may be $R_f$, the asymptotic value to which the resistance value of the heater decays over time (e.g., the $R_f$ value used in Equation 1 above), and the transfer function is a pass-through function, e.g., y=x, however the example embodiments are not limited thereto. The output layer then outputs the estimated steady state heater resistance value.

According to at least one example embodiment, the weight matrix and the bias values of the at least one hidden layer, and the weight vector and the bias value of the at least one output layer of the neural network may be determined by training the neural network against a training data set corresponding to actual measured resistance values of the heater of the nicotine e-vaping device (or an equivalent heater which exhibits similar temperature/electrical characteristics as the heater included in the nicotine e-vaping device), the measured resistance values corresponding to the times when the measured resistance values used as inputs to the neural network will be measured (e.g., at the time that power to the heater is cut off, at the beginning of the decay slope, at the beginning of the decay curve ankle, etc.), as well as a measurement of the actual steady state resistance value (e.g., a measurement taken at the end of the decay period, such as 30 to 60 seconds after the heater has been turned off). During the neural network training phase, the measured resistance values, not including the measured steady state resistance values, of the training data set are input into the neural network and the mean square error (MSE) of the estimated steady state resistance and the actual steady state resistance value is measured to produce an estimation algorithm for the neural network. The estimation algorithm is then used to adjust the parameters of the neural network (e.g., the weight matrix values, bias values, etc., of the hidden layers and the output layers), and the training is repeated until the neural network outputs an estimated steady state resistance value (and/or an estimated asymptotic resistance value) within a desired margin of error of the actual steady state resistance values. Based on experiments conducted, a training data set may include between 20 to 100 puff events/decay events, and five runs of the training set may be performed to accurately train the neural network. However, the example embodiments are not limited thereto.

Figure 7A:
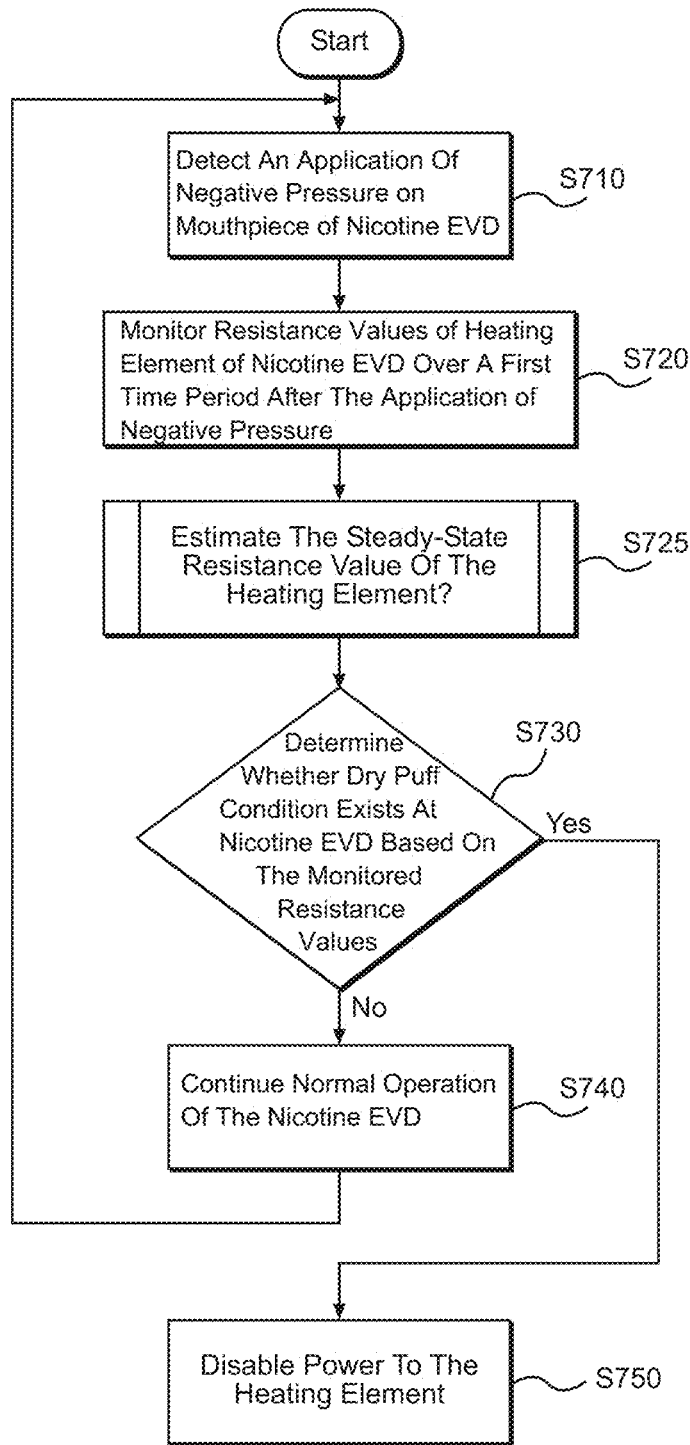
FIGS. 7A to 7B are flowcharts illustrating a method for detecting a dry puff event using a steady state resistance value of a heating element of a nicotine e-vaping device according to at least one example embodiment.
Figure 7B:
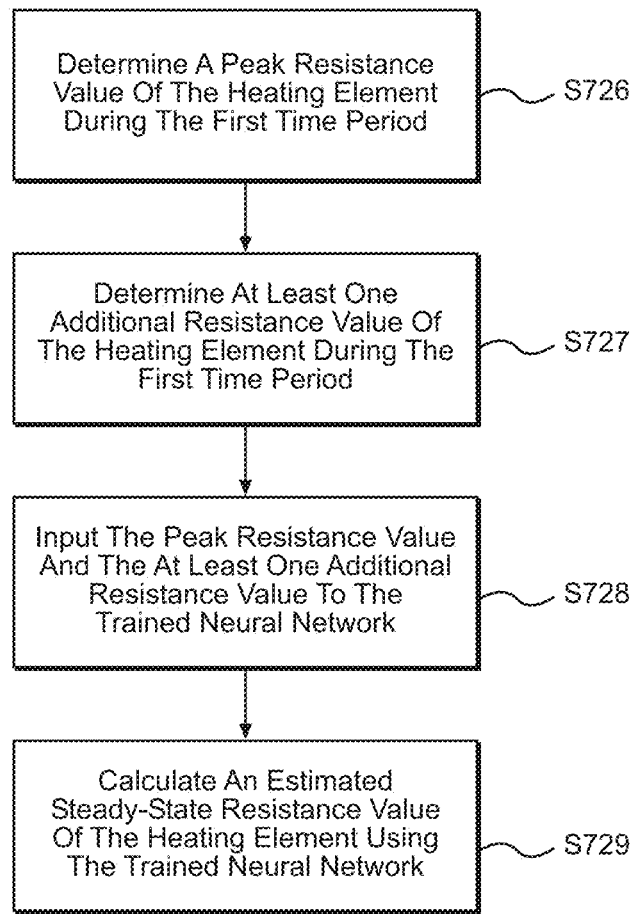

FIGS. 7A to 7B are flowcharts illustrating a method for detecting a dry puff event using a steady state resistance value of a heating element of a nicotine e-vaping device according to at least one example embodiment.

According to at least one example embodiment, in operation S710, a nicotine e-vaping device may detect the application of negative pressure (e.g., a puff event) by an adult vaper. In operation S720, the nicotine e-vaping device may take at least one real-time measurement of the resistance value of the heater of the nicotine e-vaping device following the end of the application of the negative pressure and the subsequent cutting off of power between the power source and the heater of the nicotine e-vaping device. According to some example embodiments, three or more measurements of the resistance value of the heater may be obtained, including a measurement at the time when the power to the heater is cut off, a measurement at the time when the beginning of the decay slope is observed, and/or a measurement at the time when the beginning of the decay curve ankle is observed, etc., however the example embodiments are not limited thereto. At operation S725, the measured resistance values of the heater are then input to the trained neural network and the nicotine e-vaping device utilizes the trained neural network to estimate a steady state resistance value (e.g., estimated final resistance value) of the heater. An example calculation of an estimated steady state resistance value will be discussed in further detail in connection with FIG. 7B.

In operation S730, the nicotine e-vaping device determines whether a dry puff condition exists at the heater of the nicotine e-vaping device based on the estimated steady state resistance value of the heater and a desired threshold resistance value. In the event that the nicotine e-vaping device determines that no dry puff condition exists, the nicotine e-vaping device continues normal operation of the nicotine e-vaping device (S740) and returns to operation S710.

Returning to operation S730, in the event that the nicotine e-vaping device determines that a dry puff condition exists, the nicotine e-vaping device disables power to the heater (S750). According to some example embodiments, information may be saved to the memory of the nicotine e-vaping device and/or the memory of the nicotine pod assembly containing the nicotine pre-vapor formulation (e.g., nicotine cartridge, reservoir containing nicotine pre-vapor formulation, etc.) indicating that the nicotine pod assembly is empty. The information may include a unique identifier for identifying the nicotine pod assembly. Furthermore, the power to the heater may remain disabled until a new nicotine pod assembly (e.g., a nicotine pod assembly that is not empty) is inserted into the nicotine e-vaping device. The nicotine e-vaping device may determine whether a newly inserted nicotine pod assembly is a new nicotine pod assembly or an nicotine empty pod assembly based on the information stored on the memory of the nicotine e-vaping device and/or the nicotine pod assembly.

As mentioned above, FIG. 7B illustrates a method for estimating a steady state heater resistance value using a trained neural network. Referring to FIG. 7B, according to at least one example embodiment, at operation S726, the nicotine e-vaping device measures a peak resistance value of the heater (e.g., the resistance value at the time when power to the heater is cut off) during the decay period (e.g., a first time period) using a heater resistance measuring circuit. At operation S727, the nicotine e-vaping device measures at least one additional resistance value of the heater during the decay period (e.g., the first time period) using the heater resistance measuring circuit. In operation S728, the nicotine e-vaping device may input the measured peak resistance value and the measured at least one additional resistance value into the trained neural network. In operation S729, the nicotine e-vaping device performs the calculations of the trained neural network and outputs an estimated steady state resistance value of the heater, which is used in operation S730 of FIG. 7A.

Example embodiments described provide methods, systems, apparatuses, and/or non-transitory computer readable media for detecting a dry puff event based on an estimated steady-state resistance value of a heater of a nicotine e-vaping device. One or more example embodiments may reduce the size and/or manufacturing costs of nicotine e-vaping device and/or provide more accurate temperature readings.

Example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

I claim:

1. A nicotine electronic vaping device (EVD) comprising:
   a heating element configured to heat nicotine pre-vapor formulation; and
   control circuitry configured to,
      monitor a resistance value of the heating element over a first time period after a first application of negative pressure to the nicotine EVD,
      determine an estimated steady state resistance value of the heating element based on the monitored resistance value, and
      control power to the heating element based on the estimated steady state resistance value.

2. The nicotine EVD of claim 1, wherein the control circuitry is further configured to:
   determine the estimated steady state resistance value of the heating element based on the monitored resistance value using a trained neural network, the trained neural network trained using a dataset including a plurality of puff events and decay events.

3. The nicotine EVD of claim 2, wherein the control circuitry is further configured to monitor the resistance value of the heating element by:
   measuring a plurality of resistance values of the heating element during the first time period; and
   input the plurality of resistance values into the trained neural network to determine the estimated steady state resistance value.

4. The nicotine EVD of claim 1, wherein the control circuitry is further configured to monitor the resistance value of the heating element by:
- determining a peak resistance value of the heating element during the first time period; and
- determining at least one additional resistance value of the heating element at a time after the determined peak resistance value during the first time period.

5. The nicotine EVD of claim 4, wherein
the peak resistance value is determined at a time when the power being applied to the heating element is stopped after the first application of negative pressure to the nicotine EVD.

6. The nicotine EVD of claim 5, wherein the control circuitry is further configured to determine the estimated steady state resistance value of the heating element by:
- estimating the estimated steady state resistance value of the heating element using a trained neural network based on the peak resistance value and the at least one additional resistance value.

7. The nicotine EVD of claim 6, wherein the trained neural network is a function-fitting network configured to:
- receive the peak resistance value and the at least one additional resistance value as input values;
- determine a decay in the input values over the first time period; and
- output the estimated steady state resistance value of the heating element based on results of the determined decay in the resistance value of the heating element over the first time period.

8. The nicotine EVD of claim 1, wherein
the heating element is connected to a Wheatstone bridge circuit.

9. The nicotine EVD of claim 8, wherein the control circuitry is further configured to:
- detect a resistance value corresponding to the Wheatstone bridge circuit over the first time period; and
- estimate the estimated steady state resistance value of the heating element based on the detected resistance value corresponding to the Wheatstone bridge circuit.

10. The nicotine EVD of claim 1, wherein the control circuitry is further configured to:
- detect a variable resistance value corresponding to the heating element over the first time period; and
- estimate the estimated steady state resistance value of the heating element based on the detected variable resistance value corresponding to the heating element.

11. The nicotine EVD of claim 1, wherein the control circuitry is further configured to:
- detect dry puff conditions at the nicotine EVD based on the estimated steady state resistance value of the heating element; and
- disable power to the heating element in response to the detected dry puff conditions.

12. The nicotine EVD of claim 1, wherein the control circuitry is further configured to:
- detect dry puff conditions at the nicotine EVD based on the estimated steady state resistance value of the heating element; and
- prevent power from being applied to the heating element in response to detection of a second application of negative pressure to the nicotine EVD.

13. A nicotine electronic vaping device (EVD) comprising:
- a heating element configured heat nicotine pre-vapor formulation; and
- control circuitry configured to,
  - detect dry puff conditions at the nicotine EVD based on an estimated steady state resistance value of the heating element, and
  - prevent power from being applied to the heating element in response to detection of a current application of negative pressure to the nicotine EVD and the detected dry puff conditions.

14. The nicotine EVD of claim 13, wherein the control circuitry is further configured to:
- monitor a resistance value of the heating element over a first time period after a previous application of negative pressure to the nicotine EVD; and
- determine the estimated steady state resistance value of the heating element based on the monitored resistance value.

15. The nicotine EVD of claim 14, wherein the control circuitry is further configured to:
- input the monitored resistance value of the heating element into a trained neural network to determine the estimated steady state resistance value of the heating element.

16. The nicotine EVD of claim 15, wherein the monitored resistance value of the heating element includes:
- a peak resistance value of the heating element during the first time period; and
- at least one additional resistance value of the heating element during the first time period.

17. The nicotine EVD of claim 16, wherein the trained neural network is configured to:
- estimate the steady state resistance value of the heating element based on the peak resistance value and the at least one additional resistance value.

18. The nicotine EVD of claim 16, wherein the trained neural network is a function-fitting network configured to:
- receive the peak resistance value and the at least one additional resistance value as input values;
- determine a decay in the input values over the first time period; and
- output the estimated steady state resistance value of the heating element based on results of the determined decay in the resistance value of the heating element over the first time period.

19. The nicotine EVD of claim 16, wherein
the peak resistance value is determined at a time when the power being applied to the heating element is stopped after the previous application of negative pressure to the nicotine EVD.

20. The nicotine EVD of claim 16, wherein
the at least one additional resistance value is determined at a time following the time when the peak resistance value is determined.

* * * * *